United States Patent
Sagara

[11] Patent Number: 5,906,775
[45] Date of Patent: May 25, 1999

[54] METHOD OF PRODUCING SUBSTRATE FOR OPTICAL DISC

[75] Inventor: Koichi Sagara, Tochigi-ken, Japan

[73] Assignee: Kao Corporation, Tokyo, Japan

[21] Appl. No.: 08/773,090

[22] Filed: Dec. 24, 1996

[30] Foreign Application Priority Data

Dec. 28, 1995 [JP] Japan .................................. 7-342438

[51] Int. Cl.⁶ ........................... B29D 11/00; B29D 17/00
[52] U.S. Cl. ........................ 264/1.33; 264/106; 425/810
[58] Field of Search ................................. 264/1.33, 106, 264/107; 425/810

[56] References Cited

U.S. PATENT DOCUMENTS 5,274,623 12/1993 Usami et al. .

5,458,818 10/1995 Kim et al. .............................. 264/1.33
5,603,870 2/1997 Roll et al. ............................. 264/1.25

FOREIGN PATENT DOCUMENTS 0 418 897 3/1991 European Pat. Off. .
24 10 740 9/1975 Germany .

Primary Examiner—Mathieu D. Vargot
Attorney, Agent, or Firm—Oblon, Spivak, McClelland, Maier & Neustadt, P.C.

[57] ABSTRACT

A prescribed molded substrate is molded out of a melted resin with a stamper having projections for forming pits with the shape of the projections preliminarily set to be greater than the shape of pits of the substrate to be molded. The relationship between the height H of the projections for forming the pits to the stamper and the depth d of the molded substrate is such that H/d=1.3 to 1.8.

2 Claims, 1 Drawing Sheet

METHOD OF PRODUCING SUBSTRATE FOR OPTICAL DISC

BACKGROUND OF THE INVENTION

1. Field of the Invention

The present invention relates to a method of producing a substrate for an optical disc such as CD, LD, MD, MO, PD, and DVD.

2. Description of the Related Art

Conventionally, substrates for optical discs, for example, substrates for compact discs are molded at a melted-resin temperature of 330° C. under such molding conditions that the mold temperature (i.e., the temperature of the water for controlling the temperature of a mold ) is 70 to 120° C., the cooling time ranges from the filling of the resin to the taking-out thereof and the pressure dwell time (hereinafter referred to as "the cooling time") is 3.5 sec. or more (the molding cycle: about 5.5 sec. or more).

Meanwhile, along with an increase in the demand for optical discs of late, it is required that the molding cycle be shortened in order to improve the production capacity. As a means for shortening the substrate molding cycle, shortening the time in mechanical operations, such as the time of the opening and closing operation of the mold and the taking-out operation, and shortening the time in the molding process, such as the time of the filling/cooling of the resin, are conceivable. However, in order to shorten the time in mechanical operations, it is required to remodel the machines, leading to a great loss of time and an increase in cost. On the other hand, with respect to the shortening of the time in the molding process, there are specifications to be maintained in accordance with the standards of the play-back signal level, the error signal level, warp etc. (e.g., the below-mentioned Yellow Book standards in the case of compact discs). It is very difficult to shorten the molding time with complying with these specifications.

SUMMARY OF THE INVENTION

Accordingly, an object of the present invention is to provide a novel method of producing a substrate for an optical disc, wherein the molding cycle can be shortened and an optical disc of good quality can be easily produced at low cost.

The present inventors have intensively studied the molding of substrates for optical discs and have found that the above object can be attained by molding a substrate out of a melted resin under specific molding conditions while using a specific stamper having projections for forming pits, the shape of the projections being preliminarily set to be larger than the shape of pits of the substrate to be molded.

The present invention has been made on the basis of the above finding and provides a method of producing a substrate for an optical disc, comprising molding a prescribed molded substrate out of a melted resin with a stamper having projections for forming pits, the shape of the projections being preliminarily set so as to be larger than the shape of pits of the substrate to be molded.

Further, in a mode of operation of the method of producing a substrate for an optical disc according to the present invention, said molded substrate satisfies optical disc standards, and the relationship between the height H of said projections for forming pits in said stamper and the depth d of the pits of said molded substrate has the relationship H/d=from 1.3 to 1.8.

Further, the present invention provides a method of producing a substrate for an optical disc, comprising molding a prescribed molded substrate out of a melted resin at a mold temperature of 40 to 70° C. in the range of cooling time of 1.5 to 2.5 sec. by using a stamper having projections that have such a pit forming ability that the play-back signal of the substrate molded under the transfer limit conditions is 0.85 to 0.93 at $I_{11}$ and 0.012 to 0.046 at a push-pull signal.

By use of the method of producing a substrate for an optical disc according to the present invention, the molding cycle can be shortened and a substrate of good quality for an optical disc can be easily produced.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 1:
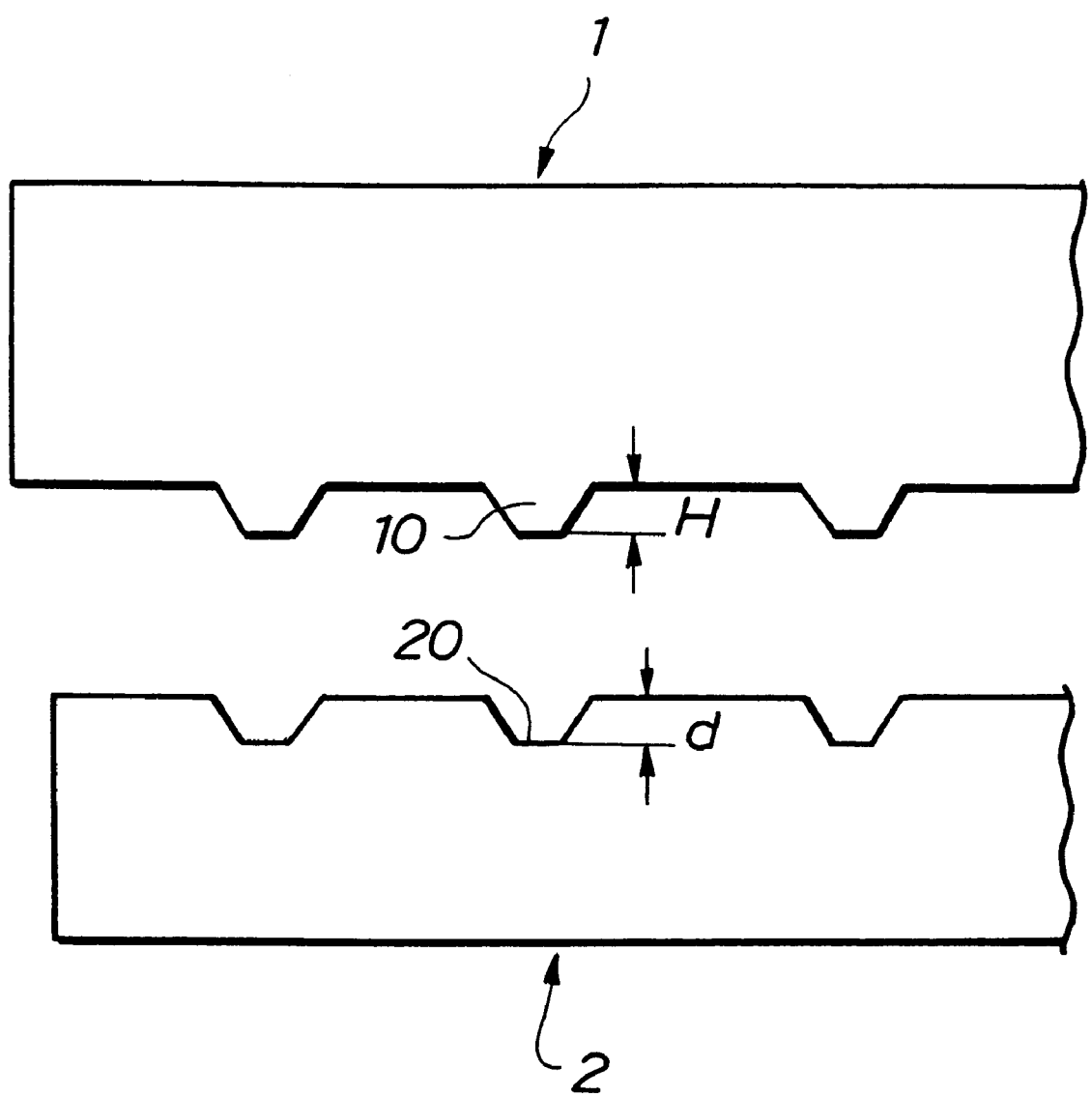
FIG. 1 is a conceptional view, showing the shape and size of a stamper to be used in the method of producing a substrate for an optical disc according to the present invention and those of the molded substrate to be produced by using said stamper.

A mode of operation of the present invention will now be described in detail with reference to the accompanying drawing.

In the method of producing a substrate for an optical disc according to the present invention, a prescribed molded substrate is molded out of a melted resin with a stamper having projections for forming pits, the shape of the projections being preliminarily set so as to be larger than the shape of pits of the substrate to be molded.

The prescribed molded substrate to be produced in the present invention is a substrate that satisfies optical disc standards. As said optical disc standards, physical standards of various optical disc standards, such as Yellow Book standards (CD-ROM SYSTEM DESCRIPTION), can be mentioned, and for example in the case wherein the molded substrate is a substrate for a compact disc, said Yellow Book standards are such that the maximum deviation in the particular molded substrate (in the same substrate) is suppressed to be 0.05 at $I_{11}$ and 0.005 at PP while $I_{11}$ and PP of that substrate are 0.65 or more and 0.045 to 0.065, respectively.

Further, the stamper to be used in the present invention is preferably such a stamper that the relationship between the height H of projections 10 for forming pits in that stamper 1 (see FIG. 1) and the depth d of pits 20 of the substrate 2 to be molded (see FIG. 1) is H/d=from 1.3 to 1.8. If H/d is less than 1.3, it is required that the mold temperature be 70° C. or more and that the cooling time be 2.5 sec. or more whereas if H/d is greater than 1.8, the molding has to be done in a range of cooling time of less than 1.5 sec. and the cooling will be insufficient. If the molded substrate is a substrate for a compact disc, the above H/d value is preferably from 1.3 to 1.8, more preferably from 1.5 to 1.7.

In the present invention, as the resin material to be used for the substrate to be molded, common resin materials conventionally used for the above optical discs, such as polycarbonates, PMMA and polyolefins, can be used.

As the molding method utilized, any of the injection molding methods and the injection compression molding methods which are conventionally used as a method of molding a substrate for an optical disc can be adopted.

In the method of the present invention, when a substrate for an optical disc that satisfies the above Yellow Book standards is produced out of a polycarbonate by injection molding or injection compression molding, use is made of a stamper having projections that have such a pit forming ability that the signal level of the substrate molded under the transfer limit conditions of 0.85 to 0.93 at the play-back signal $I_{11}$ and 0.012 to 0.046 at the push-pull signal. If that stamper does not have projections having the above pit forming ability, the molded substrate for an optical disc will not satisfy the Yellow Book standards when the mold temperature is lowered and the molding cycle is shortened.

The term "the transfer limit condition" will be explained hereinbelow.

When a substrate is molded out of a given resin, there exist the following molding conditions:

(1) the specific melt resin temperature or a higher temperature, (2) the specific mold temperature or a higher temperature, and (3) the specific cooling time or a longer time, under which molding conditions the molded substrate maintains the maximum play-back signal $I_{11}$ and the minimum push-pull signal.

Substrates molded under the molding conditions wherein the melt resin temperature is lower than the above specific melt resin temperature, the mold temperature is lower than the above specific mold temperature, or the cooling time is shorter than the above specific cooling time, do not show the above maximum play-back signal $I_{11}$ and the above maximum push-pull signal.

In the present invention, "the transfer limit conditions" refers to the three molding conditions (1), (2) and (3) as discussed above.

The transfer limit conditions depend on the kind of resins and can be easily determined through experiments by one of ordinary skill.

When the resin is a polycarbonate, the transfer limit conditions are such that (1) the melted resin temperature is 330° C. or a higher temperature, (2) the mold temperature is 90° C. or a higher temperature, and (3) the cooling time is 3.5 sec. or a longer period of time.

A polycarbonate is formed into a molded substrate with the above stamper at a melted resin temperature of 330° C. at a taking-out temperature of 125° C. or less. In the molding, the mold temperature is set to be 40 to 70° C., preferably 45 to 65° C., and the cooling time is set to be 1.5 to 2.5 sec., preferably 2.0 to 2.5 sec. If the mold temperature and the cooling time are outside the above ranges, the substrate not cooled to the heat distortion temperature or below will be withdrawn, which makes the substrate warped, or one or both of the play-back signal and the push-pull signal PP of the formed substrate fall outside the above Yellow Book standards.

Now, the present invention will be more specifically described with reference to Example. However, the scope of the present invention is not limited to the Example.

EXAMPLE

A compact disc stamper having projections with such a pit forming ability that the signal level of a substrate molded under the transfer limit conditions (the resin material: polycarbonate; the melted resin temperature: 330° C. or higher; the mold temperature: 90° C. or higher; and the cooling time: 3.5 sec. or longer) would be 0.92 at the play-back signal $I_{11}$ and 0.032 at the push-pull signal was produced. Using this stamper a substrate for a compact disc was produced by injection molding with a disc molding machine (DISK3MIII manufactured by Sumitomo Heavy Industries, Ltd.) and a φ 120CD mold (manufactured by Seiko-giken) under high-speed molding conditions (the resin material: polycarbonate; the melted resin temperature: 330° C., the mold temperature: 60° C.; the cooling time: 2.0 sec.).

With respect to the thus produced substrate for a compact disc, the play-back signal $I_{11}$ and the push-pull signal PP were measured using a CD signal evaluation apparatus (CD-CATS-SA3 manufactured by Audio Development). The ratio H/d of the height of projections for forming pits of the stamper to the depth of the pits of the molded substrate was measured by an interatomic force microscope (NANOSCOPE III manufactured by Digital Instruments). The results are shown in Table 1.

COMPARATIVE EXAMPLE

With respect to a molded substrate molded under the same high-speed molding conditions as those in the above Example by using a stamper having projections with such a pit forming ability that the signal level of the molded substrate molded under the transfer limit conditions would be within the Yellow Book standards, the signal level and the H/d value were measured according to the same measuring method as that in the above Example. The measured values (Comparative Example 1) are also shown in Table 1.

A stamper having projections for forming pits that did not have such a pit forming ability that the signal level of a molded substrate molded under the transfer limit conditions was 0.85 to 0.93 at the play-back signal $I_{11}$ and 0.012 to 0.046 at the push-pull signal was used to mold a substrate at a mold temperature of 40 to 70° C. in the range of cooling time of 1.5 to 2.5 sec. With respect to the resulting molded substrate, the signal level and the H/d value were measured according to the same measuring method as that in the above Example. The measured values (Comparative Examples 2 and 3) are also shown in Table 1.

Further, results were obtained carrying out the molding under molding conditions with the mold temperature being 90° C. and the cooling time being 2.5 sec. or the mold temperature being 30° C. and the cooling time being 1.5 sec. (Comparative Examples 4 and 5) and the results obtained by carrying out the molding under molding conditions with the mold temperature being 70° C. and the cooling time being 2.6 sec. or more, or the mold temperature being 40° C. and the cooling time being less than 1.5 sec. (Comparative Examples 6 and 7) are also shown in Table 1.

TABLE 1

| | Mold Temperature (° C.) | Cooling Time (sec) | Stamper | $I_{11}$ | PP | H/d |
|---|---|---|---|---|---|---|
| Example 1 | 60 | 2.0 | a | 0.81 | 0.055 | 1.5 |
| Comparative Example 1 | 60 | 2.0 | b | 0.66 | 0.072 | 1.6 |
| Comparative Example 2 | 40 | 1.5 | c | 0.82< | <0.045 | 1.89 |
| Comparative Example 3 | 70 | 2.5 | d | <0.70 | 0.065< | 1.24 |
| Comparative Example 4 | 90 | 2.5 | | Because the warp distortion was great, signals could not be measured. | | |
| Comparative | 30 | 1.5 | | Because the resin fluidity | | |

TABLE 1-continued

| | Mold Temperature (° C.) | Cooling Time (sec) | Stamper | $I_{11}$ | PP | H/d | |
|---|---|---|---|---|---|---|---|
| Example 5 | | | | | | | was lowered, the appearance became defective. |
| Comparative Example 6 | 70 | 2.6≦ | | | | | Because the molding cycle became too lengthy, this example was without merit. |
| Comparative Example 7 | 40 | ≦1.4 | | | | | In view of the structure of the molding machine, plasticizing and metering of the resin could not be carried out in time and the time required could not be shortened. | a: Stamper having a pit forming ability with $I_{11} = 0.92$ and PP = 0.032 under the transfer limit conditions.
b: Stamper having a pit forming ability with $I_{11} = 0.85$ and PP = 0.051 under the transfer limit conditions.
c: Stamper having a pit forming ability with $I_{11} > 0.93$ and PP < 0.012 under the transfer limit conditions.
d: Stamper having a pit forming ability with $I_{11} < 0.85$ and PP > 0.046 under the transfer limit conditions.

As shown in Table 1, according to the Example, it was confirmed that a substrate for a compact disc that satisfies the signal level of the Yellow Book standards can be produced in a short molding cycle.

As described above, according to the method of the Example for producing optical discs, the molding cycle can be shortened considerably and a substrate of good quality for an optical disc can be produced easily. Further, in comparison with the conventional method, the mold temperature at the time of molding can be lowered and therefore the production cost can be lowered further.

Obviously, numerous modifications and variations of the present invention are possible in light of the above teachings. It is therefore to be understood that, within the scope of the appended claims, the invention may be practiced otherwise than as specifically described herein.

What is claimed is:

1. A method of producing a substrate for an optical disc, which comprises:

molding a prescribed molded substrate out of a melted resin with a stamper having projections for forming pits, preliminarily setting the shape of the projections so as to be greater in size than the pits of the substrate to be molded; and limiting the relationship between a height H of the projections for forming the pits of said stamper and a depth d of the pits of said molded substrate such that H/d=1.3 to 1.8.

2. The method according to claim 1, which comprises maintaining during molding a mold temperature of 40–70° C. over a range of cooling time of 1.5 to 2.5 sec.

* * * * *